(12) United States Patent
Holler

(10) Patent No.: US 6,954,140 B2
(45) Date of Patent: Oct. 11, 2005

(54) METHOD AND APPARATUS FOR VEHICLE ROLLOVER PREDICTION AND PREVENTION

(75) Inventor: Gusztav Holler, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 82 days.

(21) Appl. No.: 10/472,020

(22) PCT Filed: Mar. 14, 2002

(86) PCT No.: PCT/US02/07741

§ 371 (c)(1),
(2), (4) Date: Sep. 16, 2003

(87) PCT Pub. No.: WO02/074593

PCT Pub. Date: Sep. 26, 2002

(65) Prior Publication Data

US 2004/0102894 A1 May 27, 2004

Related U.S. Application Data

(63) Continuation of application No. 09/810,036, filed as application No. PCT/US02/07741 on Mar. 14, 2002, now abandoned.

(51) Int. Cl.$^7$ .................................................. B60Q 1/00
(52) U.S. Cl. ...................... 340/438; 340/441; 340/442; 180/197; 701/71; 701/72; 701/73; 701/79
(58) Field of Search ................................ 340/438, 440, 340/441; 701/70, 71, 72, 79; 180/197

(56) References Cited

U.S. PATENT DOCUMENTS

| | | |
|---|---|---|
| 4,952,908 A | 8/1990 | Sanner |
| 4,953,654 A | 9/1990 | Imaseki et al. |
| 5,407,257 A | 4/1995 | Iwata |
| 5,479,348 A | 12/1995 | Sasaki |
| 5,481,455 A | 1/1996 | Iwata et al. |
| 5,556,176 A | 9/1996 | Bosch et al. |
| 5,869,943 A | 2/1999 | Nakashima et al. |
| 6,002,974 A | 12/1999 | Schiffmann |
| 6,002,975 A | 12/1999 | Schiffmann et al. |
| 6,038,495 A | 3/2000 | Schiffmann |
| 6,081,761 A | 6/2000 | Harada et al. |
| 6,086,168 A | 7/2000 | Rump |
| 6,089,680 A * | 7/2000 | Yoshioka et al. ............ 303/146 |
| 6,354,607 B1 * | 3/2002 | Kawashima et al. ...... 280/5.511 |
| 6,415,215 B1 * | 7/2002 | Nishizaki et al. ............. 701/70 |
| 6,498,976 B1 * | 12/2002 | Ehlbeck et al. ............... 701/70 |

FOREIGN PATENT DOCUMENTS

| | | |
|---|---|---|
| DE | 198 02 041 A | 7/1999 |
| EP | 0 649 776 A | 4/1995 |
| EP | 0 842 836 A | 5/1998 |
| EP | 1 070 643 A | 1/2001 |
| JP | 4-232349 | 8/1992 |

* cited by examiner

*Primary Examiner*—Julie Bichngoc Lieu
(74) *Attorney, Agent, or Firm*—Calfee, Halter & Griswold LLP

(57) ABSTRACT

A rollover prevention device and method detects an impending rollover situation for a vehicle (10) having a high center of gravity (cg). The system alerts the operator to potentially dangerous driving conditions and/or automatically slows the velocity of the vehicle (10) to prevent rollover. An electronic control unit for receives output signals from wheel velocity, engine revolution, and engine load sensors and then calculates lateral acceleration, wheel slip difference, and drive torque from the signals. A lateral acceleration limit is defined by plotting lateral acceleration, wheel slip difference and drive torque as a three dimensional surface.

11 Claims, 5 Drawing Sheets

METHOD AND APPARATUS FOR VEHICLE ROLLOVER PREDICTION AND PREVENTION

This application is a 371 of PCT/US02/07741 filed on Mar. 14, 2002 which is a continuation of application Ser. No. 09/810,036 filed Mar. 16, 2001 now abandoned.

FIELD OF THE INVENTION

The invention relates in general to a system that detects and prevents impending vehicle rollover. More specifically, the invention relates to a system for predicting and preventing rollover that defines a safe lateral acceleration limit based on a calculated lateral acceleration, wheel slip difference and drive torque.

BACKGROUND OF THE INVENTION

Approximately fifty-five percent of all tractor semi-trailer combination vehicle operator fatalities occur in rollover accidents. One or more wheels lift off of the ground in the initial stages of vehicle rollover. Wheel lift, however, is almost imperceptible to the operator until the vehicle begins to roll. Unfortunately, once the operator perceives that the vehicle has tilted and is starting to rollover, it may be too late for the operator to prevent rollover.

Vehicles with a high center of gravity such as long haul trucks and truck semi-trailer combinations are particularly susceptible to rolling over during cornering at relatively moderate speeds. FIG. 1 illustrates the physical forces that act on a vehicle 10 to cause it to rollover. The vehicle has a center of gravity (cg), and the height of the center of gravity ($h_{cg}$) is the distance between this point and the ground. During steady cornering, lateral or sideways acceleration occurs, and the vehicle is influenced by a downwards force (mg) due to gravity and a lateral force ($ma_{LAT}$) due to lateral acceleration. When the vehicle is at rest or traveling in a straight line, the downwards force is equally distributed between the wheels at each axle as wheel load, that equals the normal force on each wheel ($F_{N1}$) ($F_{N2}$). During cornering, however, lateral acceleration causes a sidewise imbalance between the inner wheels 12 and the outer wheels 14 due to forces ($F_{N1}$) and ($F_{N2}$) that change the wheel load at each axle. Although the sideway imbalance force $F_N$ depends on several parameters such as torsional stiffness and curve radius, the these parameters may be value may be approximated a constant C and the sideways imbalance force $F_N$ may be calculated with the following equation:

$$F_N = C * h_{cg} * a_{LAT}$$

As the lateral acceleration increases, the sideway imbalance force $F_N$ reduces the downwards wheel load on the inner wheels, and increases the downwards wheel load on the outer wheels. If the lateral acceleration exceeds a safe level, the inner wheel load is reduced to zero the vehicle rolls over.

FIG. 2 is a graph that illustrates the inverse relationship between the height of the center of gravity and the lateral acceleration value as vehicle rollover is approached. The solid line represents a vehicle with a high center of gravity, and the dashed line represents a vehicle with a low center of gravity. The vehicle overturns when the inner wheel load equals zero. As shown in the graph, almost twice as much lateral acceleration is required for the vehicle with the low center of gravity to overturn as is required for the vehicle with the high center of gravity.

In the past, basic rollover sensors have been employed in vehicles that detect an impending rollover condition by physically measuring the angular position of the vehicle. These basic rollover sensors use a pendulum that normally hangs vertically downward due to the earth's gravitational force. Many basic vehicular sensing devices simply monitor the angular position of the vehicle relative to a level ground horizontal position. Thus, the basic vehicle rollover sensors are susceptible to error when the vehicle travels around a turn or becomes airborne, because the earth's gravitational force, which the sensor relies on, may be overcome by other forces.

More recently, sophisticated rollover sensing systems have been utilized. One such approach requires the use of a plurality of sensors including accelerometers and angular rate sensors, also referred to as gyros, all of which are employed together for use in an inertial navigation system which tracks position and attitude of the vehicle. The accelerometers generally provide lateral, longitudinal, and vertical acceleration measurements of the vehicle, while the gyros measure pitch rate, roll rate, and yaw rate. However, the more sophisticated rollover sensing approaches generally require several costly high-precision sensors. In addition, these systems are susceptible to cumulative drift errors, and therefore they must be re-calibrated when needed.

It is therefore an object of the present invention to provide a vehicle rollover prediction and prevention system that requires a minimum of sensors and is relatively immune to errors generally found in conventional automotive-grade sensors. It is another object of the present invention to provide for vehicle rollover sensing for a vehicle that may predict a rollover condition and allow time to deploy automatic braking or engine velocity reduction. It is a further object of the present invention to provide for reliable vehicle rollover prediction and prevention with a relatively simple low-cost device.

SUMMARY OF THE INVENTION

The present invention provides a device and a method for rollover prediction and prevention that detects an impending rollover situation for a vehicle having a high center of gravity, such as a straight truck, tractor/semi-trailer combination, or tanker truck. The system alerts the operator to potentially dangerous driving conditions and/or automatically slows the velocity of the vehicle to prevent rollover.

In a preferred embodiment, the device includes wheel velocity sensors for producing output signals, an engine revolution sensor for producing an output signal, an engine load sensor for producing an output signal, a rollover prevention device. An electronic control unit receives output signals from the wheel velocity, engine revolution, and engine load sensors and calculates lateral acceleration, wheel slip difference, and drive torque from the signals. The calculated lateral acceleration, wheel slip difference and drive torque are then used to define a safe lateral acceleration limit. A rollover prevention device is activated if the lateral acceleration exceeds the safe lateral acceleration limit.

In a further preferred embodiment, two separate lateral acceleration limits are defined, namely, a first lateral acceleration limit for rollover warning and a second lateral acceleration limit for rollover intervention. An operator warning system is preferably activated when the acceleration exceeds the first lateral acceleration limit. At least one of an electronic brake controller and an electronic engine controller is activated when the calculated lateral acceleration exceeds the second lateral acceleration limit.

In a preferred method, a controller receives output signals from a plurality of wheel velocity sensors, an engine revolution sensor, and an engine load sensor, and calculates lateral acceleration, wheel slip difference, and drive torque from the output signals. The lateral acceleration, wheel slip difference, and drive torque are then plotted as a three dimensional surface which is used to define a lateral acceleration limit. Activation of a rollover prevention device then occurs when the calculated lateral acceleration exceeds the lateral acceleration limit.

Other advantages and features of the invention will become apparent from the following detailed description of the preferred embodiments and the accompanying drawings.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

Figure 1:
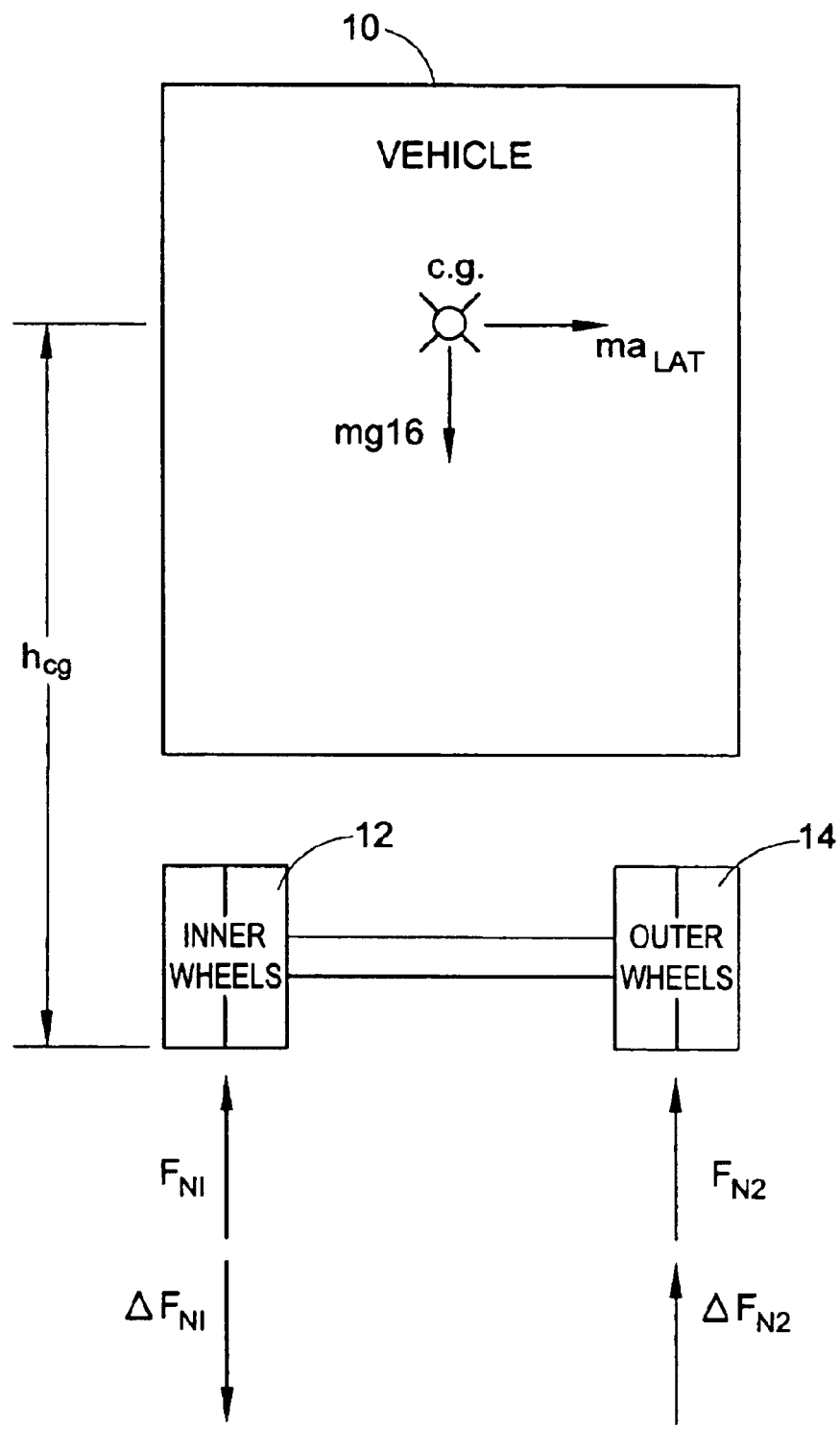
FIG. 1 is a diagram of the forces that contribute to vehicle rollover.
Figure 2:
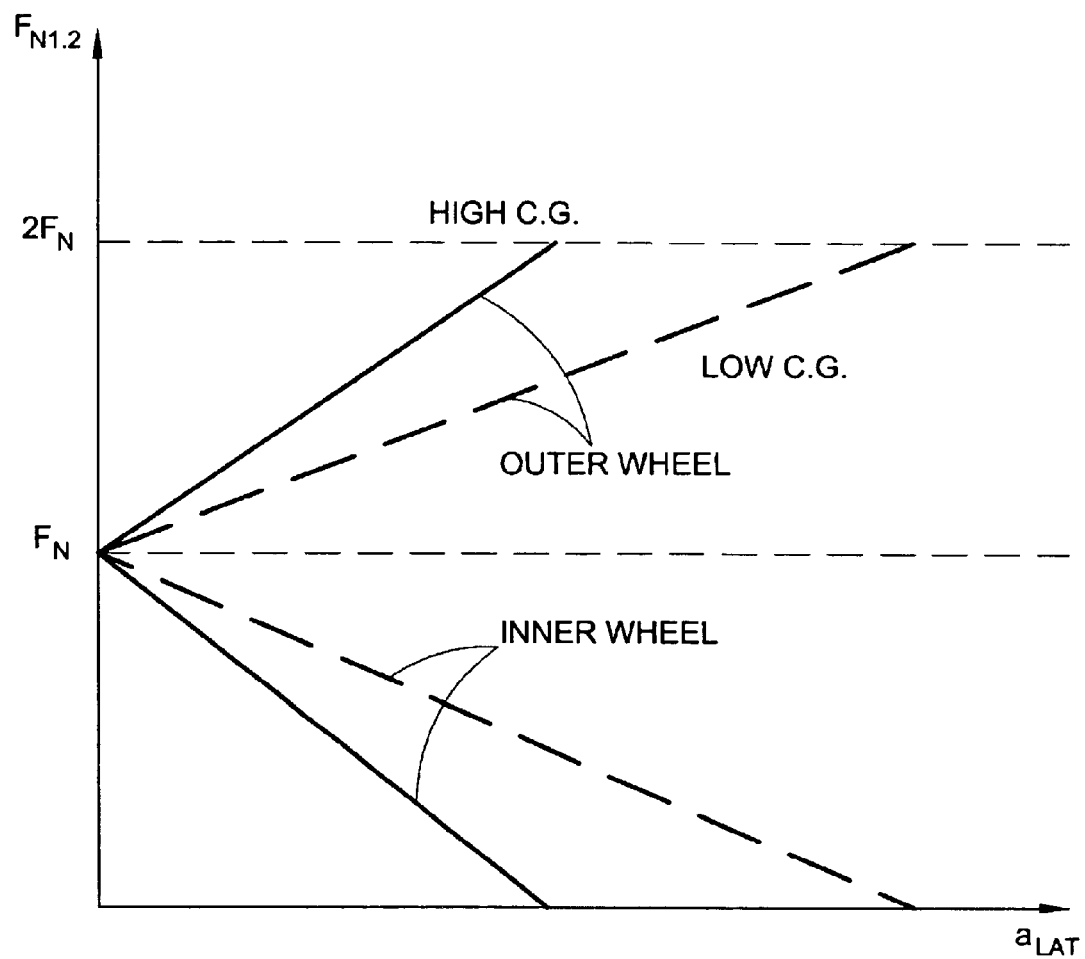
FIG. 2 is a plot of wheel load force vs. lateral acceleration.
Figure 3:
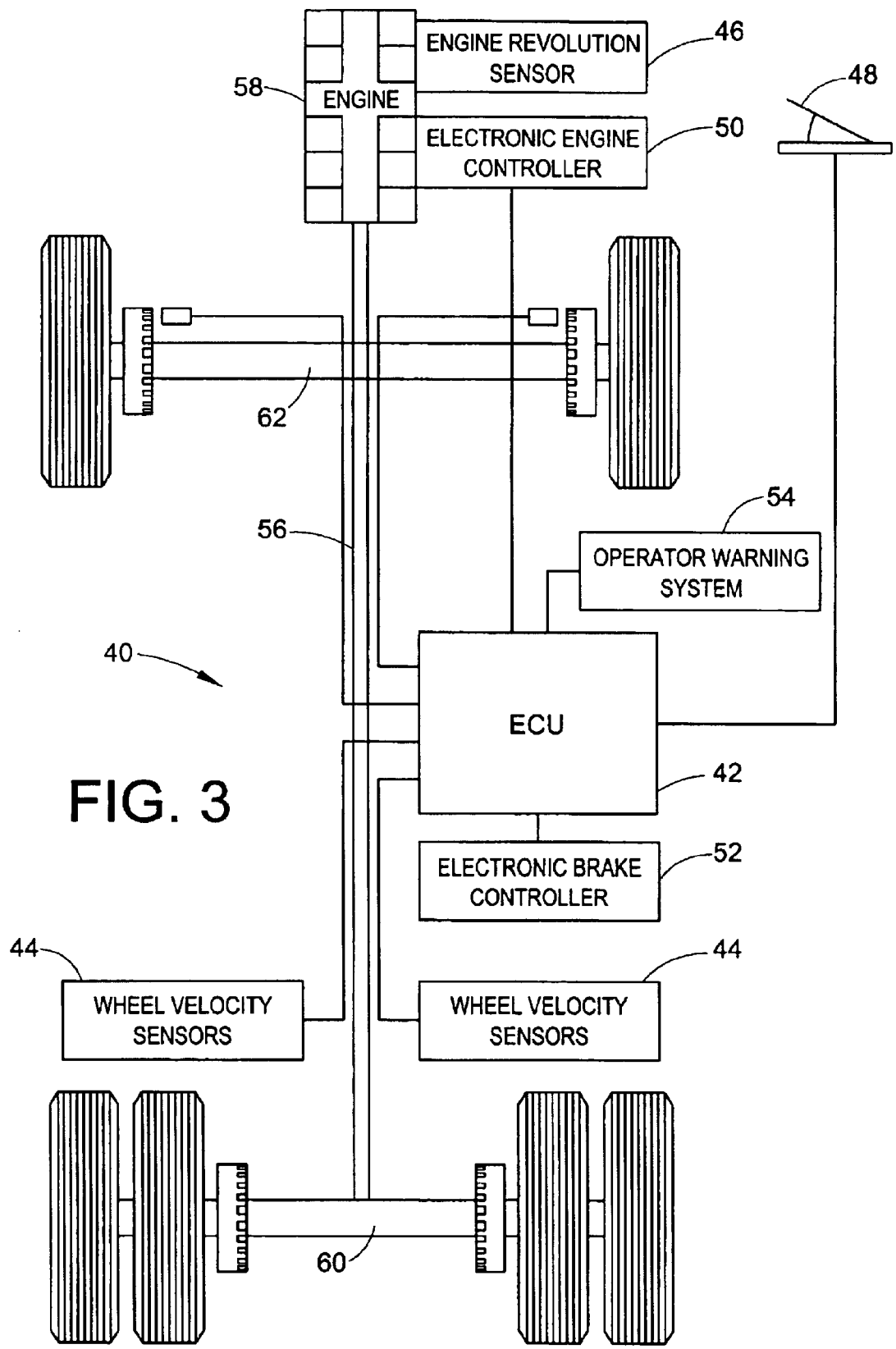
FIG. 3 is a plan view of a vehicle that is equipped with a vehicle rollover prediction and prevention system.

FIG. 3 is a plan view of a vehicle that is equipped with a rollover prediction and prevention system 40 in accordance with the present invention for use in sensing lateral acceleration, drive torque, and wheel slip difference for a vehicle and predicting a rollover condition of the vehicle. The rollover prediction and prevention system 40 preferably includes the following components: an electronic control unit (ECU) 42, wheel velocity sensors 44, an engine revolution sensor 46, an engine load sensor 48, an electronic engine controller 50, an electronic brake controller 52, and an operator warning system 54. The ECU 42 monitors the output signals of the wheel velocity sensors 44, engine revolution sensor 46, and engine load sensor 48, controls the electronic engine controller 50, controls the electronic brake controller 52, and communicates with the operator via the operator warning system 54. The ECU 42 is preferably a microprocessor-based controller preferably including an electrically erasable programmable read-only memory (EEPROM)—not shown—that stores various programmed calculations for performing the rollover sensing algorithm. The EEPROM can be integrated with the ECU 42 or provided external thereto. It will be understood, however, that ECU 42 may be implemented using any type of general purpose processor, discrete hardware, application specific integrated circuits or any other components that will operate to perform the monitoring and control functions of the ECU 42.

As shown in FIG. 3, vehicles such as trucks typically are equipped with rear wheel drive, and a drive shaft 56 transmits the torque from the engine 58 to a rear driven axle 60. In accordance with a preferred embodiment, a pair of wheel velocity sensors 44 are mounted on the rear driven axle 60, and a pair of wheel velocity sensors 44 are mounted on a front non-driven axle 62. The engine revolution sensor 46 is a conventional sensor mounted on the engine 58. The engine load sensor 48 is mounted on the accelerator pedal or the accelerator linkage. The electronic engine control unit 42 is mounted on the engine and it reduces engine power and utilizes an engine brake (not shown) to reduce the engine velocity. The electronic brake controller 52 preferably interfaces with a conventional antilock braking system, to control the braking force that is delivered to the individual wheels. The operator warning system 54 is mounted in the operator's cab. The operator warning system 54 preferably includes a warning or indicator display and an audible alarm. The audible alarm may include a buzzer or a recorded voice message to instruct the operator to slow the velocity of the vehicle.

The rollover prediction and prevention system 40 of the present invention is used to sense vehicle dynamics and predict a rollover condition of the vehicle. Upon predicting a vehicle rollover condition, the rollover prediction and prevention system 40 provides an output signal indicative of the predicted rollover condition. The rollover condition output signal may be supplied to one or more selected vehicle devices to warn the driver of impending rollover or to automatically reduce the velocity of the vehicle to prevent rollover. The ECU 42 processes the various input signals, as will be explained hereinafter, and produces output signals identified as a rollover warning signal wherein the operator is warned to slow down and a rollover intervention signal, wherein the system automatically slows the vehicle to a safe velocity.

Figure 4:
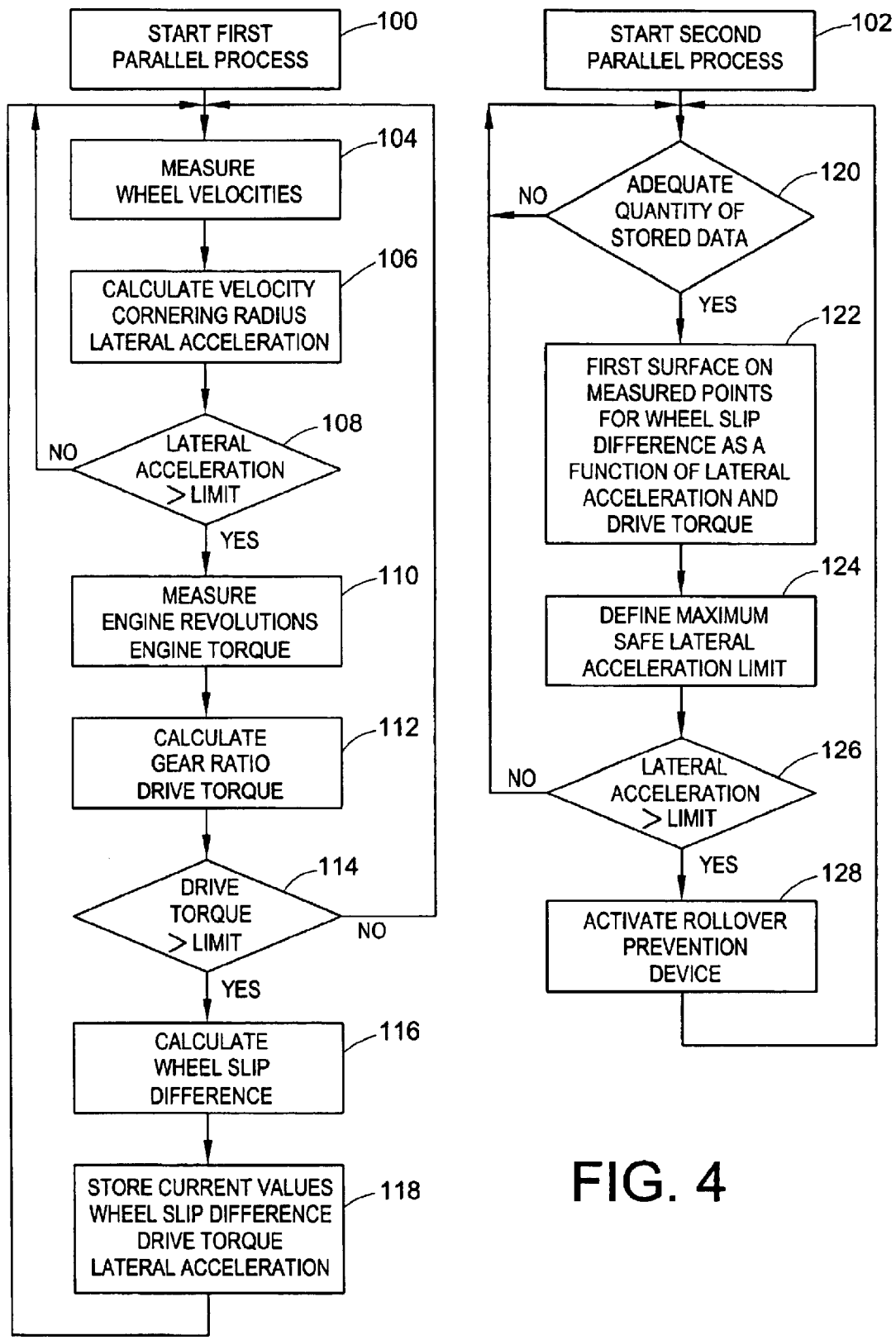
FIG. 4 is a schematic of the methodology utilized by the rollover prediction and prevention system to detect impending vehicle rollover.

Referring to FIG. 4, a rollover prediction methodology is shown for predicting a vehicle rollover condition and deploying one or more rollover prevention devices in response thereto. The rollover prediction algorithm is preferably implemented in software that is stored in the EEPROM and operated upon via the ECU 42. However, the algorithm for predicting a rollover condition of a vehicle according to the present invention is implemented with discrete circuitry.

The rollover prediction methodology utilizes two parallel processes (100, 102) that are commenced simultaneously. The first parallel (100) process begins and proceeds to measure wheel velocities (104), wherein wheel velocity signals are obtained from the wheel velocity sensors 44. The parameters of velocity, cornering radius and lateral acceleration are then calculated (106). Specifically, the vehicle velocity is determined by averaging the wheel velocity signals. During cornering, the inner wheels track a smaller turning radius that the outer wheels, and as a result the inner wheels move more slowly than the outer wheels. Cornering radius is calculated utilizing the difference between the wheel velocity signals from the front non-driven axle 62 and the horizontal distance between the left and right front wheels. The lateral acceleration of the vehicle is calculated from the vehicle velocity and the cornering radius. A comparison is then made to compare the absolute value of the lateral acceleration to a predetermined lateral acceleration threshold limit. If the lateral acceleration threshold limit is not exceeded, the process then goes back to the measuring wheel velocities and recalculates the lateral acceleration. If the lateral acceleration exceeds the predetermined lateral acceleration threshold limit, the ECU 42 proceeds to measure (110) an engine revolution signal from the engine revolution sensor 46 and an engine load signal from the engine load sensor 48. The ECU 42 calculates (112) the gear ratio by dividing the angular engine velocity by the average of the angular wheel velocities, and the ECU 42 calculates the drive torque on the driven axle utilizing the engine load and the gear ratio. A decision (114) is then made to compare the calculated drive torque to a predetermined drive torque threshold limit. If the limit is not exceeded, the wheel velocity measurement process (104) is repeated. If the calculated drive torque exceeds the threshold limit, the process proceeds forwards (116) and calculates the difference between the wheel slip for the left and right wheels of the driven axle, utilizing the vehicle velocity and the left and right wheel velocities. The ECU 42 then stores the current values for wheel slip difference, drive torque, and lateral acceleration (118). The process is then repeated.

Figure 5:
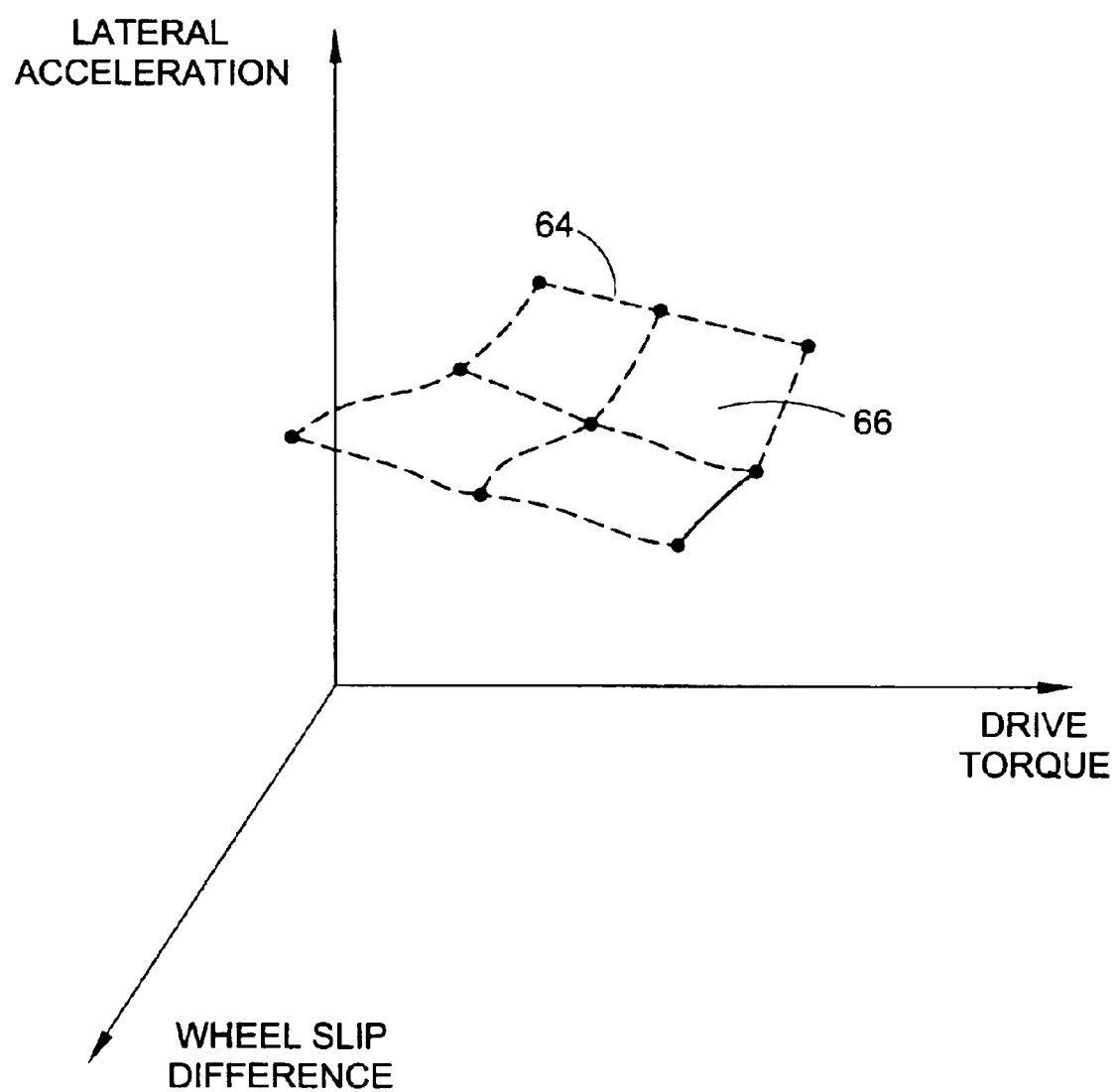
FIG. 5 is a sample three dimensional plot of wheel slip difference vs. lateral acceleration and drive torque.

The second parallel (102) process commences and proceeds to a decision (120) where a determination is made as to whether a sufficient quantity of parameters for wheel slip difference, drive torque, and lateral acceleration have been stored to plot a three dimensional surface. If the three dimensional surface cannot be plotted, the process loops around. If a sufficient quantity of parameters have been stored, the ECU 42 proceeds to plot a three dimensional surface of slip difference as a function of lateral acceleration and drive torque (122). FIG. 5 illustrates a hypothetical plot of calculated data points 64 for slip difference as a function of lateral acceleration and drive torque as a three dimensional surface 66. The ECU 42 then preferably defines a safe lateral acceleration limit for rollover warning and a safe lateral acceleration limit for rollover intervention (126). The safe lateral acceleration limit for rollover warning is calculated by extrapolating the surface 66 until it intersects with a first predetermined three dimensional surface of maximum slip difference as a function of lateral acceleration and drive torque, and projecting the intersection downwards towards the lateral acceleration axis to obtain the safe lateral acceleration limit for rollover warning. The safe lateral acceleration limit for rollover intervention is calculated by extrapolating the surface 66 until it intersects with a second predetermined three dimensional surface of maximum slip difference as a function of lateral acceleration and drive torque, and projecting the intersection downwards towards the lateral acceleration axis to obtain the safe lateral acceleration limit for rollover intervention. The ECU 42 then compares the current lateral acceleration with the calculated limits (126). If the current lateral acceleration is not greater than the limits, the process starts again. If the current lateral acceleration is greater than either one of the limits, the process proceeds to warn the driver and activate rollover prevention (128). Specifically, the ECU 42 generates a rollover warning output signal that activates the operator warning system to warn the operator to slow the vehicle down. If the lateral acceleration exceeds the rollover intervention limit, ECU 42 generates a rollover intervention signal that activates at least one of the electronic engine controller 50 and the electronic brake controller 52 to automatically slow the velocity of the vehicle to a safe velocity and prevent overturning.

Accordingly, the rollover prediction and prevention system of the present invention provides a prediction of a rollover condition of a vehicle prior to the occurrence of a vehicle rollover so that selected devices may be deployed in a timely fashion to prevent rollover. The wheel velocity, engine revolution, and engine load sensors utilized by the present invention are relatively immune to substantial errors present in automotive-grade sensors and, therefore, provides enhanced accuracy, as well as reducing the number of sensors that may otherwise be required in previously known approaches.

The invention has been described with reference to certain preferred embodiments thereof. It will be understood, however, that modification and variations are possible within the scope of the appended claims. For example, the lateral acceleration may be sensed with a conventional lateral acceleration sensor. In addition, for better accuracy, integration of wheel speeds may be utilized instead of calculation the wheel slip difference. Other know combinations of sensing devices may be utilized to generate the slip difference, lateral acceleration, and drive torque data.

What is claimed is:

1. A vehicle rollover prediction and prevention system for a vehicle comprising:
   a plurality of wheel velocity sensors for producing wheel velocity signals;
   an engine revolution sensor for producing an engine revolution signal;
   an engine load sensor for producing an engine load signal;
   a rollover prevention device; and
   an electronic control unit for receiving signals from the wheel velocity sensors, engine revolution sensor, and engine load sensors and for calculating lateral acceleration, wheel slip difference, and drive torque;
   wherein the electronic control unit defines at least one lateral acceleration limit based on the calculated lateral acceleration, wheel slip difference and drive torque and activates the rollover prevention device when the lateral acceleration exceeds the lateral acceleration limit.

2. A vehicle rollover prediction and prevention system as claimed in claim 1, wherein the rollover prevention device includes at least one of an electronic engine controller, an electronic brake controller, and an operator warning system.

3. A vehicle rollover prediction and prevention system as claimed in claim 2 wherein the electronic control unit defines at a first lateral acceleration limit for rollover warning and a second lateral acceleration limit for rollover intervention.

4. A vehicle rollover prediction and prevention system as claimed in claim 3 wherein the operator warning system is activated when the calculated lateral acceleration exceeds the first lateral acceleration.

5. A vehicle rollover prediction and prevention system as claimed in claim 3 wherein at least one of the electronic engine controller and the electronic brake controller are activated when the calculated lateral acceleration exceeds the second lateral acceleration limit.

6. A method for vehicle rollover prediction and prevention comprising:
   receiving output signals from a plurality of wheel velocity sensors, an engine revolution sensor, and an engine load sensor;
   calculating lateral acceleration, wheel slip difference, and drive torque from the output signals of the wheel velocity sensors, engine revolution sensor, and engine load sensor;
   plotting lateral acceleration, wheel slip difference, and drive torque as a three dimensional surface;
   defining a lateral acceleration limit by extrapolation of the three dimensional surface; and
   activating the rollover prevention device when the calculated lateral acceleration exceeds the lateral acceleration limit.

7. The method for vehicle rollover prediction and prevention as claimed in claim 6, wherein the rollover prevention device includes at least one of an electronic engine controller, an electronic brake controller, and an operator warning system.

8. A vehicle rollover prediction and prevention system as claimed in claim 7 wherein defining the lateral acceleration limit includes defining at least one of a first lateral acceleration limit for rollover warning and a second lateral acceleration limit for rollover intervention.

9. A vehicle rollover prediction and prevention system as claimed in claim 8 wherein the operator warning system is activated when the calculated lateral acceleration exceeds the first lateral acceleration limit.

10. A vehicle rollover prediction and prevention system as claimed in claim 8 wherein at least one of the electronic engine controller and the electronic brake controller are activated when the calculated lateral acceleration exceeds the second lateral acceleration limit at least one of the electronic engine controller and the electronic brake controller.

11. A device for vehicle rollover prediction and prevention comprising:

means for receiving output signals from a plurality of wheel velocity sensors, an engine revolution sensor, and an engine load sensor;

means for calculating lateral acceleration, wheel slip difference, and drive torque from the output signals of the wheel velocity sensors, engine revolution sensor, and engine load sensor;

means for plotting lateral acceleration, wheel slip difference, and drive torque as a three dimensional surface;

means for defining a lateral acceleration limit by extrapolation of the three dimensional surface; and means for activating the rollover prevention device when the calculated lateral acceleration exceeds the lateral acceleration limit.

* * * * *